Figure 1:
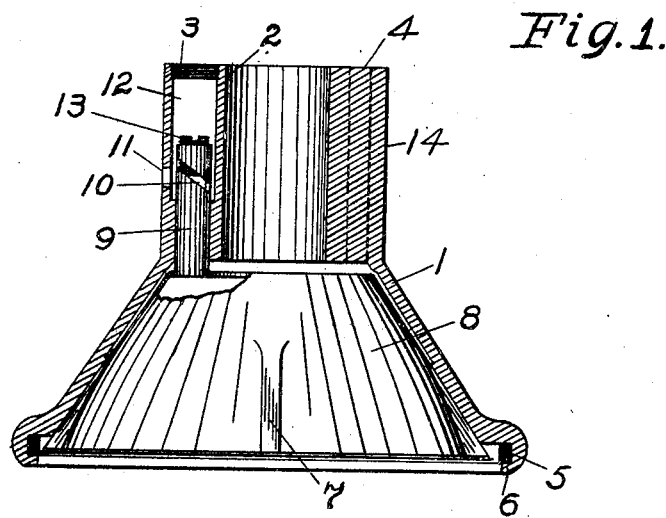

No. 890,050. PATENTED JUNE 9, 1908.
C. H. HACKETT & T. W. MORGAN.
CREAM EXIT FOR CENTRIFUGAL CREAM SEPARATORS.
APPLICATION FILED AUG. 19, 1907.

WITNESSES:
H. M. Harper
Josephine McCarty

INVENTORS
Charles H. Hackett and
Thomas W. Morgan.
BY
G. C. Kennedy
ATTORNEY

UNITED STATES PATENT OFFICE.

CHARLES H. HACKETT AND THOMAS W. MORGAN, OF WATERLOO, IOWA, ASSIGNORS TO WILBUR W. MARSH, OF WATERLOO, IOWA.

CREAM-EXIT FOR CENTRIFUGAL CREAM-SEPARATORS.

No. 890,050.  Specification of Letters Patent.  Patented June 9, 1908.

Application filed August 19, 1907. Serial No. 389,184.

*To all whom it may concern:*

Be it known that we, CHARLES H. HACKETT and THOMAS W. MORGAN, citizens of the United States of America, and residents of Waterloo, Blackhawk county, Iowa, have invented certain new and useful Improvements in Cream-Exits for Centrifugal Cream-Separators, of which the following is a specification.

Our invention relates to improvements in cream exits for centrifugal cream separators, and the object of our improvement is to provide a cream exit which has included means for adjusting its line of delivery to or from the axis of the separator bowl with a view of thereby enhancing or diminishing the content of voided cream relative to the proportion of milk thereby mixed therewith in the escaping stream ejaculated from said exit. This object we have accomplished by the means which are hereinafter described and claimed, and which are illustrated in the drawing, in which—

Figure 2:
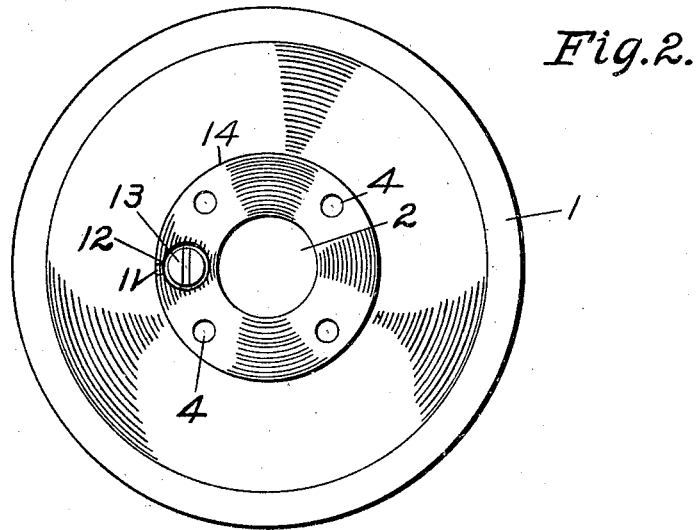

Figure 1 is a vertical central axial section of the cover of a centrifugal cream separator bowl, with our improved adjustable cream conduit and exit therein, and Fig. 2 is an upper plan view of said cover, and its cream-exit.

Similar numbers refer to similar parts throughout the several views.

We have shown at 1 the ordinary conical cover for a centrifugal cream separator bowl having a concentric basal groove or bearing seat 6 for the reception of a rubber packing-ring 5. The upper part of this conical cover is projected upward in the form of a hollow concentric cylinder 14, whose central axial orifice 2 is adapted to receive means for clamping said cover to the bowl as well as acting as an inlet for the full milk. A plurality of channels 4 are provided through the cylinder 14 to serve as milk exits. The numeral 12 denotes a vertical channel in said cylinder 14, open at top and bottom, the upper portion of said channel being of greater diameter than its lower part. A cream-exit-tube 9 is adapted to enter the lower part of the channel 12 and fit within such lower more contracted part of said channel, but having its upper part projecting upward into the expanded part of the channel so that the oblique slot 10 may be above the base of such expanded part to deliver freely thereinto.

The lower end of the cream-exit-tube 9 is affixed to and communicates with the interior space of the hollow frustum 8, the latter being adapted to fit within but spaced apart a short distance from the inner periphery of the conical portion 1 of the separator cover. The frustum 8 is provided with spacing lugs 7 to contact with the inside of said cover 1 and thus space the said parts away from each other.

The cream-exit-tube 9 has an oblique slot 10 cutting through it near its upper end so as to divide it to its diametral line which coincides with the bowl's radius. In other words, the inner and outer ends of the slot are in a single vertical plane which passes through one of the radii of the cylinder 14.

The upper end of the tube 9 is interiorly threaded to receive an exteriorly-threaded screw-plug 13, having a transverse groove on the top whereby it may be turned and adjusted by a screw-driver. The upper part of the channel 12 is provided with an interior thread 3, within which may be secured another plug when desired, in case the lateral vent-hole 11 is used. The upper portion of the channel may be permanently closed if desired, or may be bored so as to not quite attain the top surface of the cylinder 14. The upper part of such channel may serve as the cream-delivery-vent in the event that the vent 11 is closed.

In operation, if it is desired to skim the cream so that it may be relatively rich in butter-content, the screw-plug 9 is turned a sufficient distance downward into the tube so that its lower edge will close a portion of the slot 10, similar to that adjustment shown in Fig. 1. If the skimmed cream is to be thinned by a more liberal admixture of milk, the screw-plug 9 is turned so that its lower edge is elevated and thus widens or rather lengthens the slot 10 radially so as to bring its delivery outer end farther away from the axis of the bowl. The amount of adjustment would thus be equal in extent to a diameter of said tube taken along a radial line of the bowl. The frustum 8 serves to divide the issuing separated streams of milk which pass between said frustum and the cover 1, from the cream which moves upward through the interior of said frustum to the hollow tube 9, and the adjusted vent of the latter.

Having described our invention, what we claim as new, and desire to secure by Letters Patent, is:—

1. An adjustable cream-exit for a centrifugal cream separator, consisting of the combination with the cover of a centrifugal cream separator bowl having a tubular cream-exit therein, of a rotatable plug movable longitudinally in said tubular cream-exit, said plug having a tubular orifice extending obliquely from the central point of its outer surface to its inner edge.

2. An adjustable cream-exit for a centrifugal cream separator, consisting of the combination with the cover of a centrifugal cream separator bowl, such bowl having a tubular orifice therein, of a rotatable plug in said tubular opening, said plug having an axial discharge opening in its outer surface and a tubular orifice extending from the center of the bottom of said discharge opening to the edge of the plug which lies inside of said cover and in communication with the interior of the bowl.

Signed at Waterloo, Iowa, this 30th day of July, 1907.

CHARLES H. HACKETT.
THOMAS W. MORGAN.

Witnesses:
O. D. YOUNG,
H. M. HARPER.